March 21, 1961
P. E. BESSIERE
2,975,712
SELF-REGULATING RECIPROCATING PUMPS, AND IN
PARTICULAR IN INTERNAL COMBUSTION ENGINE
FUEL INJECTION PUMPS
Filed March 18, 1958
2 Sheets-Sheet 2
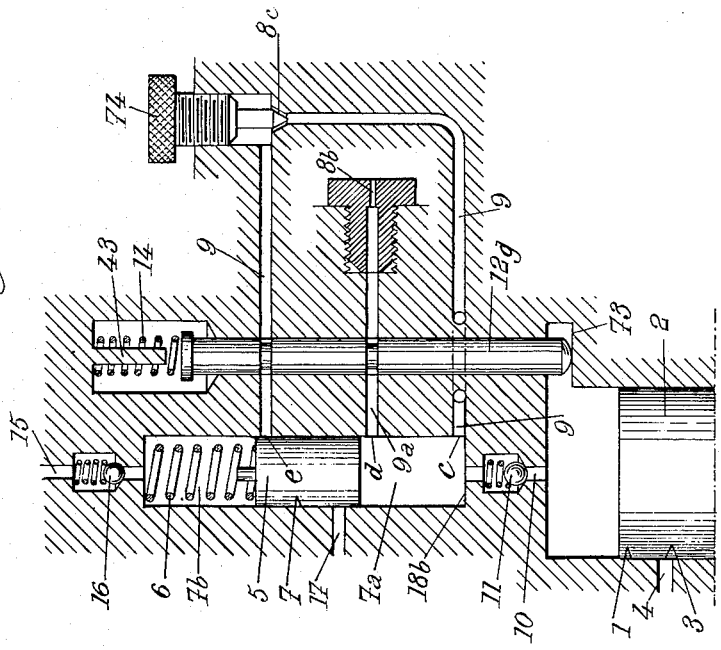
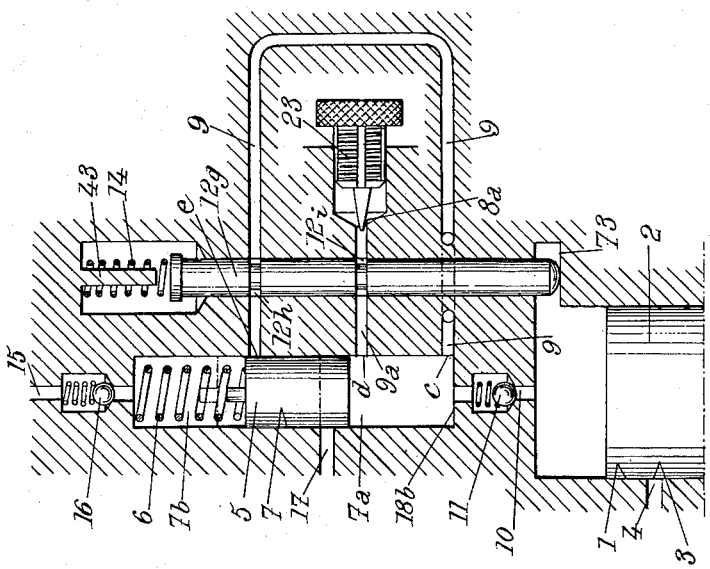
INVENTOR
PIERRE ETIENNE BESSIERE
BY
Bailey, Stephens + Huettig
ATTORNEYS › # United States Patent Office 2,975,712
Patented Mar. 21, 1961

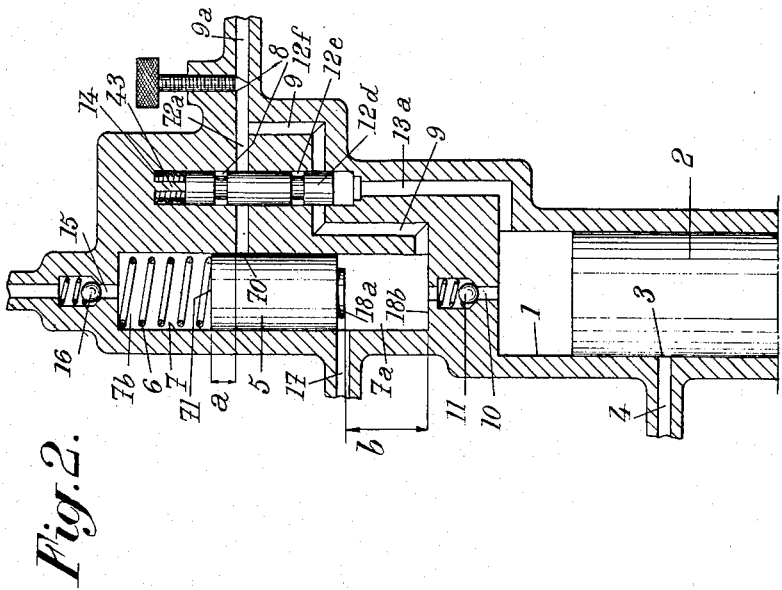

2,975,712

SELF-REGULATING RECIPROCATING PUMPS, AND IN PARTICULAR IN INTERNAL COMBUSTION ENGINE FUEL INJECTION PUMPS

Pierre Etienne Bessiere, 55 Blvd. du Commandant Charcot, Neuilly-sur-Seine, France Filed Mar. 18, 1958, Ser. No. 722,217

Claims priority, application France Mar. 18, 1957

9 Claims. (Cl. 103—41)

The present invention relates to self-regulating reciprocating action pumps, that is to say to pumps the rate of delivery of which for every piston stroke, at least for speeds of the pump exceeding a given value, decreases when this speed increases. My invention is more especially, but not exclusively, concerned with fuel injection pumps for internal combustion engines.

In my U.S. prior patent application Ser. No. 673,343, filed on July 22, 1957, for: "Improvements in Reciprocating Liquid Pumps, and in Particular in Fuel Injection Pumps," I have already described a reciprocating action self-regulating pump which includes, in order to control the amount of fuel delivered on every stroke of the pump, a reciprocable member, called "shuttle" and which may be of the form of an auxiliary piston, moving on its outward stroke under the action of the pressure of the liquid delivered by the main piston of the pump against a return force, exerted for instance by a spring, the return stroke of said shuttle being braked by a throttled section provided in a channel or conduit through which flows the liquid delivered by the shuttle during this last mentioned stroke.

The object of my invention is to provide a pump of this kind which is better adapted to meet the requirements of practice, at least in some fields of application thereof, than those known at the present time.

According to my invention, the shuttle, after a first portion of its return stroke, where it forces liquid to flow through a throttled portion of a conduit, causes the section of flow of the liquid delivered by itself to increase, whereby the speed of said shuttle is suddenly increased.

Preferred embodiments of my invention will be hereinafter described with reference to the accompanying drawings, given merely by way of example and in which:

Figs. 1 to 4 diagrammatically show, in axial section, four fuel injection pumps made according to four embodiments of my invention, respectively.

The pump includes a cylinder 1 in which moves a piston 2 driven through any suitable means, for instance by a cam not shown, this piston constituting the main pump piston. This piston controls a port 3 through which the feed conduit 4 opens into cylinder 1. A transfer pump (not shown) or the like conveys fuel from a tank (also not shown), through conduit 4, to cylinder 1 the piston 2 of which, in its lower dead center position, is located below port 3.

In order to obtain self-regulation of the pump, at least a portion of the fuel delivered by piston 2 during its delivery stroke (upward stroke) and after the closing of port 3, is made to actuate a movable member or shuttle 5, for instance in the form of an auxiliary piston, sliding against the action of a return spring 6, in a cylinder 7 so as to divide said cylinder into two chambers 7a and 7b. Chamber 7a is connected, through a conduit 10, provided with a check-valve 11, with the cylinder 1 of the pump, whereas the other chamber 7b is connected with the delivery conduit 15 of the pump, provided with a check-valve 16 and leading to the injector or injectors to be fed by the pump.

Cylinder 7 is further provided with a discharge conduit 17 which is opened by shuttle 5 when said shuttle has moved, against the resistance of spring 6, a given distance in cylinder 7, which determines the top position of shuttle 5 in cylinder 7. The lowermost position (or position of rest) of the shuttle is determined by contact of an abutment 18a, carried by the lower end of shuttle 5, against the bottom 18b of cylinder 7.

During the downward stroke (suction stroke) of the piston 2 of the pump, shuttle 5 also moves in the downward direction and delivers, after the discharge conduit 17 has been closed, the liquid present in chamber 7a, through a conduit 9 provided with a throttled section 8, preferably adjustable by a needle-screw 19, either into chamber 7b (Fig. 1), or into a conduit 9a leading to the outside, for instance to a tank not shown (Fig. 2). Conduit 9 is controlled by a slide valve 12 which closes it during the delivery stroke of piston 2, thus enabling shuttle 5 to move upwardly in cylinder 7, and which opens said conduit 9 during the suction stroke of piston 2, thus enabling shuttle 5 to deliver the fuel contained in chamber 7a into conduit 9.

In order to control the movement of slide valve 12 in accordance with the upward and downward movements of the piston 2 of the pump, as above explained, I may for instance, as shown by the drawings, provide a conduit 13 or 13a connecting the main cylinder with the under face of slide valve 12 so as to move said slide valve upwardly in its cylinder 44, against the action of a return spring 14, into a position where said slide valve is applied against an abutment 43 and then closes conduit 9. As soon as piston 2 starts moving in the downward direction, spring 14 pushes back slide valve 12 into the position where the groove 12a thereof is located in line with conduit 9 and thus opens said conduit, the lower end of slide valve 12 being then applied against the bottom 12b of cylinder 44.

According to the main feature of my invention, there is further provided, for the liquid driven out from chamber 7a by the shuttle during its return stroke, in addition to the conduit 9 in which is provided the throttled section 8, at least one supplementary outlet controlled in such manner by shuttle 5 that it is opened after said shuttle has moved through the first portion of its return stroke. Preferably this supplementary outlet is provided at 70 in the wall of cylinder 7 at a level slightly below that where the top end 71 of shuttle 5 is located when said shuttle is in its uppermost position in cylinder 7. On the drawings I have designated by $a$ the distance between the level where said end 71 of the shuttle 5 is located in the top position of said shuttle and the level of the shuttle at the end of the first portion of its downward stroke, when it begins to open port 70. On the other hand, I have designated by $b$ the distance existing, in the top position of shuttle 5, between the abutment 18a thereof and the bottom 18b of cylinder 7, this distance being equal to the maximum stroke of the shuttle.

According to a preferred embodiment, port 70 is connected, through a by-pass conduit 72, with a portion of conduit 9 located between slide valve 12 and the throttled section 8.

The operation of the pump illustrated by Fig. 1 is as follows:

When piston 2 moves upwardly, it first closes the port 3 of conduit 4 and the liquid contained in cylinder 1 is compressed and starts lifting slide valve 12 which comes into the position where it closes conduit 9. When slide valve 12 is stopped by contact with its abutment 43, the liquid delivered by piston 2, which keeps moving upwardly, opens check-valve 11 and enters the chamber 7a of cylinder 7. Shuttle 5 is thus moved upwardly in its cylinder 7. The liquid contained in chamber 7b, which can only escape through delivery conduit 15, lifts check-valve 16 and is thus fed to the injector or injectors mounted on said conduit 15. When the discharge conduit 17 is opened by shuttle 5, said shuttle stops in the position shown by Fig. 1, that is to say in a position where the top end 71 of the shuttle is located above port 70. Delivery of liquid from chamber 7b toward the injectors stops at the same time as the upward movement of shuttle 5.

When piston 2 starts moving back in the downward direction, slide valve 12 opens conduit 9 and shuttle 5 is allowed to move down in cylinder 7, driving out from chamber 7a the liquid present therein and causing it to flow, through conduit 9 and the throttled section 8 thereof, into chamber 7b, check-valve 11 being then closed. Of course, this flow of the liquid starts only when shuttle 5 has closed discharge conduit 17 the height of which is to be deduced from the first portion $a$ of the downward movement of shuttle 5. Once this conduit 17 has been wholly closed, the downward movement of the shuttle is considerably slowed down during the portion $a$ of said downward movement. But as soon as the shuttle clears port 70, the liquid which at this time is still present in chamber 7a can flow directly, through conduit 72 and port 70, into chamber 7b, so that the braking action of the throttled section 8 of conduit 9 then ceases to be effective. Spring 6 therefore expands suddenly and the shuttle moves very quickly over the distance $b-a$.

By a suitable adjustment of the throttled section 8, it is possible to obtain that, on the one hand the time $t_1$ taken by the shuttle to move through the first portion $a$ of its downward stroke is very long as compared with the time $t_2$ taken by the shuttle to move through the second portion, equal to $b-a$, of its downward stroke, and on the other hand the amount of fuel delivered by the shuttle during the first portion $a$ of its stroke into chamber 7b is relatively small, for instance equal to, or smaller than, the amount of fuel necessary to keep the engine running on no load.

In this way, I obtain a self-regulation of the pump which is extremely fine.

I designate by $\theta$ the time taken by piston 2 to move through its suction stroke (downward stroke) in cylinder 1, including therein the time for which said piston may remain stationary in its lower dead center position. $\theta$ becomes the shorter as the speed at which the piston 2 of the pump is driven becomes the higher. The time taken by shuttle 5 to move down from its top position (shown by Fig. 1) to its lowermost position in which its abutment 18a is applied against the bottom 18b of cylinder 7 is equal to the sum $t_1+t_2$, in which sum $t_1$ is much greater than $t_2$. As long as $t_1+t_2$ is greater than or equal to $\theta$, shuttle 5 delivers, on every pump stroke, into chamber 7b, a volume corresponding to the stroke $b$ of the shuttle. This volume is subsequently, during the next upward stroke of shuttle 5, delivered by said shuttle toward the injectors.

If this time $\theta$, due to a rise of the speed at which the pump is driven, becomes smaller than $t_1+t_2$, the downward stroke of shuttle 5 is reduced by the "liquid abutment" which is formed under shuttle 5 as a consequence of the fact that piston 2 is already starting on the next upward stroke before shuttle 5 has moved down to the bottom of its cylinder 7. If $\theta$ becomes equal to $t_1$, the downward stroke of shuttle 5 is only equal to $a$ and the amount of fuel conveyed into chamber 7b corresponds only to an extremely small volume, which may be for instance the amount necessary to keep the engine running on no load at a given limit speed. In view of the fact that $t_2$ is very short, I therefore obtain, for a relatively small acceleration of the speed of piston 2 above that for which $\theta$ is still equal to $t_1+t_2$, a very great reduction of the stroke of the shuttle and consequently of the amount of fuel delivered to chamber 7b. If $\theta$ becomes smaller than $t_1$, the amount of fuel that is injected is smaller than the amount necessary to keep the engine running on no load at the limit speed.

In what precedes, I have examined the variations of the amount of fuel that is injected when starting from running conditions of the engine such that the shuttle comes back, on every pump stroke, onto its solid abutment 18b, thus ensuring the injection of a maximum amount of fuel per stroke of the pump. However, normally, that is to say for driving torques ranging from the maximum torque to the torque corresponding to running on no load with a speed very slightly below the limit speed obtained by a given adjustment of the throttled section 8, I obtain working conditions such that the downward stroke of shuttle 5 is shortened by the liquid abutment effect, this shortening being the greater as the torque and therefore the load for the speed that is considered are nearer to running on no load conditions.

Anyway, whether the starting conditions correspond to a given speed and the maximum torque for which the lowermost position of shuttle 5 is determined by abutment 18b, or to running at practically the same speed with an intermediate torque such that the lowermost position of shuttle 5 is determined by a more or less important liquid abutment (the lowermost position of the shuttle is indicated in this last mentioned case for instance in dot-and-dash lines, and it corresponds to a downward displacement equal to $ba$ of abutment 18a from its uppermost position), due to the very small value of time $t_2$ (case of the maximum torque) or $t_2^a$ (case of a reduced torque corresponding to distance $ba$) a small increase of the speed at which the pump is driven, due to a reduction of the load of the engine, causes the liquid abutment to increase very quickly and the amount of fuel injected on every pump stroke to decrease to a value corresponding to running on no load or even to a lower value.

In what precedes, I have considered the operation of the pump according to the invention for a given speed corresponding to a given adjustment of the throttled section 8. When it is desired to change this speed, it suffices to change the adjustment of the throttled section 8, which determines another limit speed and also practically other working speeds, in view of the fact that the difference between said speeds and the limit speed is small in view of the very short value of $t_2$ or $t_2^a$.

It will be understood that I obtain, with the device according to my invention, a very high fineness of the self-regulation of the pump for all speeds, said fineness being adjustable at will by adjustment of the throttled section 8. This high fineness is due to the fact that the law giving, as a function of the stroke, the variation of the speed with which shuttle 5 moves down in its cylinder, instead of being a continuous law, is a law involving a discontinuity which enables the speed to pass suddenly from a low value to a high value. In other words, the liquid abutment produces its limiting effect on the displacement $b-a$ or $b^a-a$ within an extremely short time.

The pump shown by Fig. 2 differentiates from that shown by Fig. 1 in particular by the fact that the fuel delivered by shuttle 5, during the first portion $a$ of its return stroke, instead of being delivered into chamber 7b is discharged from the pump, for instance to the tank or reservoir thereof, so that this amount of liquid has no effect in the regulation of the pump. Consequently, the feed of the pump toward the injector or injectors drops from its maximum or intermediate value to a zero value when the speed at which the pump is driven exceeds said given value by an amount corresponding to the very short time $t_2$ or $t_2^a$.

Due to the fact that no fuel is delivered into chamber 7b during the portion $a$ of the stroke, that is to say during the portion of the stroke for which the throttled section 8 brakes down the downward movement of shuttle 5, I also prevent the variable suction in chamber 7b from having a disturbing effect on said braking action, and consequently on the self-regulation.

In order to obtain an operation as above referred to, conduit 9 includes a branch 9a in which the throttled section 8 is provided and which leads back to the fuel tank. Furthermore, this conduit 9 communicates, between slide valve 12d and throttled section 8, with a conduit 72a opening into cylinder 7 at 70.

During the beginning of the upward movement of shuttle 5, chamber 7b must not communicate, through conduit 72a, with the branch 9a of conduit 9, since this would prevent shuttle 5 from driving off the fuel present in chamber 7b into delivery conduit 15. This is why slide valve 12d includes a portion intended to control conduit 72a. Consequently, as soon as piston 2 starts moving upwardly and before the beginning of the upward movement of shuttle 5, this slide valve 12d closes both of the conduits 9 and 72a and it opens said conduits, by means of its grooves 12c and 12f, only when piston 2 starts on the next downward movement.

The operation of the pump shown by Fig. 2 results from the preceding explanations.

In a modification of pumps as above described, conduit 72 or 72a is also provided with a throttled section, which may be adjustable, but the section of which is in all cases greater than the section of the throttled section 8. In another modification, shuttle 5 clears, successively, during its downward stroke, several ports 70 so that the curve representing, as a function of the downward movement of the shuttle, the variation of the speed thereof, includes several steps for each of which the speed of the shuttle passes suddenly from a lower value to a higher value.

In the embodiments of my invention illustrated by Figs. 3 and 4 respectively, two conduits 9 and 9a start from the lower chamber 7a of cylinder 7, at points c and d located at different levels, but both located below the level of the opening of discharge conduit 17. Conduit 9a includes a throttled section of very small dimensions, whereas conduit 9 either includes no throttled section (Fig. 3) or has a throttled section of dimensions greater than those of the throttled section of conduit 9a (Fig. 4). During the upward movement of the piston 2 of the pump, conduits 9 and 9a are closed by a slide valve 12g, whereas they are opened by this slide valve (which is provided for this purpose with grooves 12h and 12i), during the downward movement of piston 2. In order to enable said slide valve to work in this way, its lower end extends into the cylinder 1 of the pump, so that the pressure which, during the upward movement of piston 2, exists in this cylinder, pushes the slide valve in the upward direction, against the action of a spring 14 until the upper end of the slide valve is applied against an abutment 43. During the downward movement of piston 2, slide valve 12g is moved down by spring 14 into the position shown by Figs. 3 and 4, where the lower end of this slide valve is applied against a shoulder 73 provided inside cylinder 1.

Conduit 9, which starts at c from chamber 7a, is located below the point d where conduit 9a starts from the same chamber. The other end of conduit 9 opens at e into the upper chamber 7b of cylinder 7, whereas conduit 9a communicates, in both of the embodiments shown by Figs. 3 and 4, with the outside of the pump.

Points c and d are located in such manner that shuttle 5 closes the end e of conduit 9 when it is in the uppermost position shown in dot-and-dash lines, and that it opens said end e of conduit 9, in the course of its downward stroke, just when it closes the end d of conduit 9a.

Consequently, when shuttle 5 moves down under the action of return spring 6, in cylinder 7 (this downward-movement starting when piston 2 also starts moving in the downward direction), said shuttle, after closing discharge conduit 17, first delivers the liquid present in chamber 7a exclusively through conduit 9a, the end e of conduit 9 being still closed by the shuttle at the beginning of its downward movement. When the shuttle closes, at the end of the first portion of its downward movement, the end d of conduit 9a, it simultaneously opens the end e of conduit 9, so that, during the second portion of its downward movement, it delivers the liquid still present in chamber 7a exclusively through conduit 9 into chamber 7b.

The lowermost position of shuttle 5 in cylinder 7 is determined by the cooperation of the under face of said shuttle with the bottom 18b of cylinder 7.

In the pump illustrated by Fig. 3, only conduit 9a is provided with a throttled section 8a controlled by a screw 23. The operation of this pump corresponds to that of the pump illustrated by Fig. 2. At the beginning of the downward stroke of shuttle 5, its speed is considerably slowed down by the fact that the liquid delivered by the shuttle must pass through the throttled section 8a. After the top portion of the shuttle has cleared the end e of conduit 9 and the lower portion of said shuttle has closed the end d of conduit 9a, the downward movement of the shuttle is suddenly accelerated. Due to the effect of the liquid abutment that is formed for speeds exceeding a given value in chamber 7a, and in accordance with the adjustment of the throttled section 8a, I obtain an "all speeds" self-regulation. The closing of conduit 9a by shuttle 5 has the advantage of avoiding any leak of liquid through the throttled section 8a during the second portion of the downward stroke of shuttle 5.

In the pump illustrated by Fig. 4, conduit 9a is provided with a fixed throttled section 8b and conduit 9 is provided with an adjustable throttled section 8c controlled by a screw 74. I thus obtain, instead of the "all speeds" regulation, a "limit speed" regulation. This is due to the fact that when the speed at which piston 2 is driven becomes so high that the shuttle, due to the braking to which it is subjected during the first portion of its downward stroke as a consequence of the presence of throttled section 8b can no longer open the end e of conduit 9 before piston 2 starts on the next upward stroke, any fuel injection by the pump ceases. This speed is therefore a limit speed which can never be exceeded by the engine.

On the contrary, below the limit speed, the presence of the throttled section 8c in conduit 9 increases the time for which shuttle 5, after it has opened the end e of conduit 9 and closed the end d of conduit 9a, can deliver into chamber 7b the fuel present in chamber 7a or, as soon as the liquid abutment has started being formed in this chamber 7a, a portion of this fuel. I thus obtain a higher accuracy in the determination of the amount of fuel that is delivered, especially for engines running at high speeds.

It would be possible to make both of the throttled sections 8b and 8c adjustable. In this case, advantageously, the means that control these throttled sections are interconnected, and this in such manner that the downward speed of the shuttle during the first portion of its downward stroke is, in all cases, lower than the speed thereof during the second portion of said stroke. It would thus be possible to obtain, at least within a given speed range, an "all speeds" regulation while adapting this regulation to the running conditions of the engine.

In a modification of pumps such as illustrated by Figs. 3 and 4, conduit 9a, instead of communicating with the outside of the pump, also communicates with the upper chamber 7b of cylinder 7 at a place of said chamber where the shuttle cannot cut off the communication between conduit 9a and chamber 7b.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. In a pump comprising a cylinder, a piston reciprocable in said cylinder, a delivery conduit and reciprocating feed means for supplying fuel to said delivery conduit in response to the reciprocating movement of said piston in said cylinder, a device for automatically regulating the amount of liquid delivered by said feed means to said piston is reciprocated, this device comprising, in combination, means fixed with respect to said cylinder forming a hollow space, a shuttle member reciprocable in said space to divide it into two chambers, a passage connecting one of said chambers with one end of said cylinder where liquid is entrapped during every stroke of said piston in one direction, a check-valve in said passage mounted to open toward said last mentioned chamber and to prevent the flow of liquid from said last mentioned chamber toward said cylinder, whereby said shuttle member is moved in one direction during every such stroke of said piston, resilient means for urging said shuttle member in the opposed direction, a circuit starting from said last mentioned chamber, valve means mounted in said circuit and operatively connected with said piston for closing circulation through said circuit during every such stroke of said piston, whereby liquid can circulate through said circuit only during every movement of said shuttle member in said last mentioned direction, a portion of said circuit being of restricted cross section to brake the movement of said shuttle in said last mentioned direction, and conduit means in communication with said hollow space and controlled by said shuttle member after a first portion of its movement in said last mentioned direction for giving the liquid driven by said shuttle through said circuit a large section of flow whereby said movement of said shuttle in said last mentioned direction is suddenly accelerated.

2. A pump according to claim 1 in which the last mentioned means include a conduit branching off from said circuit at a point thereof located upstream of said restricted cross section portion thereof, said last mentioned conduit being arranged to be opened by said shuttle member after said first portion of said movement.

3. A pump according to claim 2 in which the cross-section area of said conduit is greater than the cross-section area of said restricted cross-section portion of said circuit.

4. In a pump comprising a main cylinder, a main piston reciprocable in said cylinder, said main cylinder being provided at one end thereof with an outlet passage, the strokes of said main piston toward said end of said main cylinder being called delivery strokes, a delivery conduit and reciprocating feed means for supplying fuel to said delivery conduit in response to the reciprocating movement of said piston in said cylinder, a device for automatically regulating the amount of liquid delivered by said feed means to said delivery conduit in accordance with the speed at which said main piston is reciprocated, this device comprising, in combination, an auxiliary cylinder rigid with said main cylinder and connected at one end with said outlet passage, the other end of said auxiliary cylinder being in communication with said delivery conduit, a shuttle piston reciprocable in said auxiliary cylinder, said shuttle piston dividing said auxiliary cylinder into two chambers, to wit a first chamber located at said first mentioned end of said auxiliary cylinder and a second chamber located at said second mentioned end of said auxiliary cylinder, a check-valve mounted in said outlet passage opening toward said first chamber, a check-valve interposed between said second chamber and said delivery conduit and opening toward said delivery conduit, spring means for urging said shuttle piston toward said first end of said auxiliary cylinder, conduit means starting out from said first chamber, valve means in said conduit means for closing said conduit means during every delivery stroke of said main piston and for opening said conduit means during every stroke of said main piston in the opposed direction, a portion of said conduit means being of restricted cross-section to brake the outflow of liquid from said first chamber during an initial portion of the movement of said shuttle toward said first end of said auxiliary cylinder, and conduit means in communication with said auxiliary cylinder and controlled by said shuttle piston for increasing the flow passage of liquid from said first chamber during the remainder of said movement of said shuttle piston.

5. In a pump comprising a main cylinder, a main piston reciprocable in said cylinder, said main cylinder being provided at one end thereof with an outlet passage, the strokes of said main piston toward said end of said main cylinder being called delivery strokes, a delivery conduit and reciprocating feed means for supplying fuel to said delivery conduit in response to the reciprocating movement of said piston in said cylinder, a device for automatically regulating the amount of liquid delivered by said feed means to said delivery conduit in accordance with the speed at which said main piston is reciprocated, this device comprising, in combination, an auxiliary cylinder rigid with said main cylinder and connected at one end with said outlet passage, the other end of said auxiliary cylinder being in communication with said delivery conduit, a shuttle piston reciprocable in said auxiliary cylinder, said shuttle piston dividing said auxiliary cylinder into two chambers, to wit a first chamber located at said first mentioned end of said auxiliary cylinder and a second chamber located at said second mentioned end of said auxiliary cylinder, a check-valve mounted in said outlet passage opening toward said first chamber, a check-valve interposed between said second chamber and said delivery conduit and opening toward said delivery conduit, spring means for urging said shuttle piston toward said first end of said auxiliary cylinder, conduit means leading from said first chamber to said second chamber and opening into said second chamber at the top thereof, valve means in said conduit means for closing said conduit means during every delivery stroke of said main piston and for opening said conduit means during every stroke of said main piston in the opposed direction, a portion of said conduit means being of restricted cross-section to brake the outflow of liquid from said first chamber during an initial portion of the movement of said shuttle toward said first end of said auxiliary cylinder and a supplementary conduit extending from a point of said conduit means upstream of said restricted cross section portion thereof to a point of said second chamber covered by said shuttle piston when it is at the end of its stroke toward said second mentioned end of said auxiliary cylinder.

6. In a pump comprising a main cylinder, a main piston reciprocable in said cylinder, said main cylinder being provided at one end thereof with an outlet passage, the strokes of said main piston toward said end of said main cylinder being called delivery strokes, a delivery conduit and reciprocating feed means for supplying fuel to said delivery conduit in response to the reciprocating movement of said piston in said cylinder, a device for automatically regulating the amount of liquid delivered by said feed means to said delivery conduit in accordance with the speed at which said main piston is reciprocated, this device comprising, in combination, an auxiliary cylinder rigid with said main cylinder and connected at one end with said outlet passage, the other end of said auxiliary cylinder being in communication with said delivery conduit, a shuttle piston reciprocable in said auxiliary cylinder, said shuttle piston dividing said auxiliary cylinder into two chambers, to wit a first chamber located at said first mentioned end of said auxiliary cylinder and a second chamber located at said second mentioned end of said auxiliary cylinder, a check-valve mounted in said outlet passage opening toward said first chamber, a check-valve interposed between said second chamber and said delivery conduit and opening toward said delivery conduit, spring means for urging said shuttle piston toward said first end of said auxiliary cylinder, conduit means leading from said first chamber to said second chamber and opening into said second chamber at a point uncovered by said shuttle piston only when it has moved a given distance toward said first mentioned end of said auxiliary cylinder, valve means in said conduit means for closing said conduit means during every delivery stroke of said main piston and for opening said conduit means during every stroke of said main piston in the opposed direction, a supplementary conduit leading from said conduit means to the outside of said pump, a portion of said supplementary conduit being of restricted cross section, and valve means operative in response to the movements of said main piston for cutting off the end of said conduit means that opens into said second chamber from said supplementary conduit during every delivery stroke of said main piston.

7. In a pump comprising a main cylinder, a main piston reciprocable in said cylinder, said main cylinder being provided at one end thereof with an outlet passage, the strokes of said main piston toward said end of said main cylinder being called delivery strokes, a delivery conduit and reciprocating feed means for supplying fuel to said delivery conduit in response to the reciprocating movement of said piston in said cylinder, a device for automatically regulating the amount of liquid delivered by said feed means to said delivery conduit in accordance with the speed at which said main piston is reciprocated, this device comprising, in combination, an auxiliary cylinder rigid with said main cylinder and connected at one end with said outlet passage, the other end of said auxiliary cylinder being in communication with said delivery conduit, a shuttle piston reciprocable in said auxiliary cylinder, said shuttle piston dividing said auxiliary cylinder into two chambers, to wit a first chamber located at said first mentioned end of said auxiliary cylinder and a second chamber located at said second mentioned end of said auxiliary cylinder, a check-valve mounted in said outlet passage opening toward said first chamber, a check-valve interposed between said second chamber and said delivery conduit and opening toward said delivery conduit, spring means for urging said shuttle piston toward said first end of said auxiliary cylinder, a discharge conduit starting from said auxiliary cylinder at a point thereof intermediate between said ends thereof, a return conduit leading from said first chamber to said second chamber, said return conduit starting from a point close to said first mentioned end of said auxiliary cylinder, an outlet conduit leading out from said second chamber and starting from a point thereof located in a plane at right angles to said auxiliary cylinder intermediate between the planes at right angles to said auxiliary cylinder in which are located the ends of said return conduit and of said discharge conduit, said return and outlet conduits being located so that said shuttle piston moving toward said first mentioned end of said auxiliary cylinder begins to open the outlet of said return conduit into said second chamber at the same time as it begins to close the opening of said outlet conduit into said second chamber and valve means in said return and outlet conduits operative to close said last mentioned conduits during every delivery stroke of said main piston and to open said last mentioned conduits during every stroke of said main piston in the opposed direction, a portion of said outlet conduit being of restricted cross section for braking the outflow of liquid therefrom.

8. In a pump comprising a main cylinder, a main piston reciprocable in said cylinder, said main cylinder being provided at one end thereof with an outlet passage, the strokes of said main piston toward said end of said main cylinder being called delivery strokes, a delivery conduit and reciprocating feed means for supplying fuel to said delivery conduit in response to the reciprocating movement of said piston in said cylinder, a device for automatically regulating the amount of liquid delivered by said feed means to said delivery conduit in accordance with the speed at which said main piston is reciprocated, this device comprising, in combination, an auxiliary cylinder rigid with said main cylinder and connected at one end with said outlet passage, the other end of said auxiliary cylinder being in communication with said delivery conduit, a shuttle piston reciprocable in said auxiliary cylinder, said shuttle piston dividing said auxiliary cylinder into two chambers, to wit a first chamber located at said first mentioned end of said auxiliary cylinder and a second chamber located at said second mentioned end of said auxiliary cylinder, a check-valve mounted in said outlet passage opening toward said first chamber, a check-valve interposed between said second chamber and said delivery conduit and opening toward said delivery conduit, spring means for urging said shuttle piston toward said first end of said auxiliary cylinder, a discharge conduit starting from said auxiliary cylinder at a point thereof intermediate between said ends thereof, a return conduit leading from said first chamber to said second chamber, said return conduit starting from a point close to said first mentioned end of said auxiliary cylinder, an outlet conduit leading out from said second chamber to the outside of the pump and starting from a point thereof located in a plane at right angles to said auxiliary cylinder intermediate between the planes at right angles to said auxiliary cylinder in which are located the ends of said return conduit and of said discharge conduit, said return and outlet conduits being located so that said shuttle piston moving toward said first mentioned end of said auxiliary cylinder begins to open the outlet of said return conduit into said second chamber at the same time as it begins to close the opening of said outlet conduit into said second chamber and valve means in said return and outlet conduits operative to close said last mentioned conduits during every delivery stroke of said main piston and to open said last mentioned conduits during every stroke of said main piston in the opposed direction, a portion of said outlet conduit being of restricted cross section for braking the outflow of liquid therefrom.

9. A pump according to claim 8 in which a portion of said return conduit is of restricted cross-section, the cross-section area for the flow of liquid through said last mentioned restricted cross-section portion being greater than that for the flow through the restricted cross-section portion of said outlet conduit.

References Cited in the file of this patent

UNITED STATES PATENTS

| | | |
|---|---|---|
| 2,281,045 | Outin | Apr. 28, 1942 |

FOREIGN PATENTS

| | | |
|---|---|---|
| 402,603 | Great Britain | Dec. 7, 1933 |